(12) United States Patent
Prechtl et al.

(10) Patent No.: US 6,695,977 B2
(45) Date of Patent: Feb. 24, 2004

(54) USE OF CHIRAL, UNCHARGED METAL COMPOUNDS AS DOPANTS FOR LIQUID-CRYSTALLINE MATERIALS

(75) Inventors: Frank Prechtl, Frankfurt (DE); Sylke Haremza, Neckargemünd (DE); Robert Parker, Mannheim (DE); Kathrin Kürschner, Mannheim (DE); Manfred Braun, Schifferstadt (DE); Antje Hahn, Düsseldorf (DE); Ralf Fleischer, Houston, TX (US)

(73) Assignee: BASF Aktiengesellschaft, Ludwigshafen (DE)

( * ) Notice: Subject to any disclaimer, the term of this patent is extended or adjusted under 35 U.S.C. 154(b) by 66 days.

(21) Appl. No.: 10/011,748

(22) Filed: Dec. 11, 2001

(65) Prior Publication Data

US 2003/0066984 A1 Apr. 10, 2003

(30) Foreign Application Priority Data

Dec. 11, 2000 (DE) .......................... 100 61 625

(51) Int. Cl.$^7$ .................. C09K 19/54; C09K 19/58; C07F 7/28
(52) U.S. Cl. ............... 252/299.5; 252/299.2; 556/42; 556/54
(58) Field of Search .............. 428/1.1; 252/299.01, 252/299.02, 299.5; 556/42, 54

(56) References Cited

U.S. PATENT DOCUMENTS

| | | | |
|---|---|---|---|
| 5,798,147 A | 8/1998 | Beck et al. |
| 5,833,880 A | 11/1998 | Siemensmeyer et al. |
| 5,942,030 A | 8/1999 | Schuhmacher et al. |
| 6,090,308 A | 7/2000 | Coates et al. |
| 6,136,225 A | 10/2000 | Meyer et al. |
| 6,136,251 A | 10/2000 | Etzbach et al. |

FOREIGN PATENT DOCUMENTS

| | | |
|---|---|---|
| DE | 198 35 730 | 2/1999 |
| DE | 197 45 647 | 4/1999 |
| DE | 199 05 394 | 8/2000 |
| EP | 1 038 941 | 9/2000 |
| WO | WO 95/24454 | 9/1954 |
| WO | WO 95/01410 | 1/1995 |
| WO | WO 95/22586 | 8/1995 |
| WO | WO 95/24455 | 9/1995 |
| WO | WO 96/02597 | 2/1996 |
| WO | WO 96/04351 | 2/1996 |
| WO | WO 96/24647 | 8/1996 |
| WO | WO 97/00600 | 1/1997 |
| WO | WO 97/27251 | 7/1997 |
| WO | WO 97/27252 | 7/1997 |
| WO | WO 97/34862 | 9/1997 |
| WO | WO 98/12265 | 3/1998 |
| WO | WO 98/47979 | 10/1998 |
| WO | WO 99/11733 | 3/1999 |

OTHER PUBLICATIONS

CAPLUS 1998: 379372.*
W. Pyzuk, et al., "Paramagnetic Chiral Mesophases of Shiff's Base Complexes of Transition Metals", Liquid Crystals, 1993, vol. 15, pp, 265–268.
Julio Buey, et al., "Metallomesogens Presenting Blue Phases in a Glassy State and in Metallomesogen/Nematic Mixtures", Chem. Commun., 1999, pp. 441–442.
G. Piao, et al., "Chiroptical Titanium Complexes as Catalytically Active Chiral Dopants Available for Asymmetric Acetylene Polymerization", Synthetic Metals, 101, 1999, pp. 92–93.
Alex F. Drake, et al., "The Twisting Power of Some Chiral Tris–(Pentane–2,4–Dionato) Metal (III) Complexes in Nematic Liquid Crystals", Chemical Physics Letters, vol. 110, No. 6, Oct. 19, 1984, pp. 630–633.
R. Fleischer, et al., Eur. J. Org. Chem., No. 6, XP–002193353, pps. 1063–1070, "Synthesis and Structure Determination of Novel Chiral Imine–Alkoxytitanium Complexes", 1998.

* cited by examiner

*Primary Examiner*—Shean C. Wu
(74) *Attorney, Agent, or Firm*—Oblon, Spivak, McClelland, Maier & Neustadt, P.C.

(57) ABSTRACT

Improved liquid crystalline materials may be prepared by doping liquid crystalline materials with chiral, uncharged metal compounds of formula [($P^1$—$Y^1$—$A^1$—$Y^2$—$M^1$—$Y^3$—)$_n$L]$_2$Me or [($P^1$—$Y^1$—$A^1$—$Y^2$—$M^1$—$Y^3$—)$_n$L]Me (L'(—$Y^6$—$M^2$—$Y^5$—$A^2$—$Y^4$—$P^2$)$_{n'}$)$_m$. Groups $P^1$ and $P^2$ may be, independently, hydrogen, $C_1$–$C_{12}$-alkyl groups, polymerizable groups, or radicals containing a polymerizable group. $Y^1$ to $Y^6$ may be, independently, single chemical bonds, ether groups, thio groups, carbonyl groups, acid groups, etc. Groups $A^1$ and $A^2$ are spacers having from 1 to 30 carbon atoms, and $M^1$ and $M^2$ are mesogenic groups. Me may be a transition metal from the fourth, fifth or sixth period of the periodic table, except for technetium, silver, cadmium, gold, mercury, or any of the lanthanoids, or Me may be a main group element from group 14 (IUPAC system), except for carbon and lead. L is a tridentate ligand, and L' is an organic group having up to 12 carbon atoms.

31 Claims, No Drawings

USE OF CHIRAL, UNCHARGED METAL COMPOUNDS AS DOPANTS FOR LIQUID-CRYSTALLINE MATERIALS

Use of chiral, uncharged metal compounds as dopants for liquid-crystalline materials The present invention relates to the use of chiral, uncharged compounds of the general formula Ia $$[(P^1-Y^1-A^1-Y^2-M^1-Y^3-)_nL]_2Me \qquad (Ia)$$

or Ib $$[(P^1-Y^1-A^1-Y^2-M^1-Y^3-)_nL]Me(L'(-Y^6-M^2-Y^5-A^2-Y^4-P^2)_{n'})_m \qquad (Ib),$$

in which, independently of one another, $P^1$ and $P^2$ are hydrogen, $C_1-C_{12}$-alkyl, a group which is polymerizable or suitable for polymerization, or a radical which carries a group which is polymerizable or suitable for polymerization, $Y^1$ to $Y^6$ are a single chemical bond, —O—, —S—, —CO—, —CO—O—, —O—CO—, —CO—N(R)—, —(R)N—CO—, —O—CO—O—, —O—CO—N(R)—, —(R)N—CO—O— or —(R)N—CO—N(R)—, R is hydrogen or $C_1-C_4$-alkyl, $A^1$ and $A^2$ are spacers having from one to 30 carbon atoms, $M^1$ and $M^2$ are mesogenic groups, n' and n are values of 0 or 1, m is a value of 1, 2 or 3, where the m $L'(-Y^6-M^2-Y^5-A^2-Y^4-P^2)_{n'}$ groups in the formula Ib may be different, Me is a transition metal from the fourth, fifth or sixth period, with the exception of technetium, silver, cadmium, gold, mercury and the lanthanoids, or a main-group element from group 14 (in the IUPAC system), with the exception of carbon and lead, L is a tridentate ligand of the formula II $$\begin{array}{c} b_1 \diagup U \\ \phantom{b}V \\ b_2 \diagdown W, \end{array} \qquad (II)$$

in which

U, V and W are nitrogen-, oxygen-, phosphorus- or sulfur-containing groups which contain a nitrogen, oxygen, phosphorus or sulfur atom respectively having at least one free electron pair via which the coordination to the center Me takes place, $b_1$ and $b_2$ are alkylene or alkenylene bridges having two or three carbon atoms which are bonded to the nitrogen, oxygen, phosphorus or sulfur atom of the groups U and V (for $b_1$) or of the groups V and W (for $b_2$) and which, in the case of a $C_2$-alkenylene bridge, may be substituted by up to two, in the other cases by up to four organic radicals having up to 12 carbon atoms, and in which two adjacent carbon atoms in the alkylene or alkenylene bridge may be part of an unsubstituted or substituted, simple or benzo-fused benzene ring, and L' is an organic radical having up to 12 carbon atoms, as dopants for liquid-crystalline materials.

The invention furthermore relates to compounds of the general formula IIIa $$[(P^1-Y^1-A^1-Y^2-M^1-Y^3-)L]_2Me \qquad (IIIa)$$

and IIIb $$[(P^1-Y^1-A^1-Y^2-M^1-Y^3-)L]Me(L'(-Y^6-M^2-Y^5-A^2-Y^4-P^2)_{n'})_m \qquad (IIIb),$$

where the variables $P^1$, $P^2$, $Y^1$ to $Y^6$, $A^1$, $A^2$, $M^1$, $M^2$, n', m, Me, L and L' are as already defined above.

Cholesteric liquid-crystal mixtures are usually prepared using a liquid-crystalline (nematic) base material and one or more optically active dopants. This enables the optical properties of the mixture to be varied by simply changing the ratio of liquid-crystalline base material to dopant.

Although chiral dopants for liquid-crystalline phases are known in large number from the scientific and patent literature, relatively little is known on the use of chiral, uncharged metal compounds as dopants for liquid-crystalline materials.

The phase behavior of chiral copper (II), nickel (II), oxovanadium (IV) and palladium (II) complexes of 4-(4-heptyloxybenzoyloxy)-N-(S)-2-methylbutylsalicylaldehyde, in which the central ion is tetracoordinated, has been investigated by W. Pyzuk and Yu. Galyametdinov in Liquid Crystals, 1993, Vol. 15, No. 2, pp. 265–268. The salicylaldehyde derivative here functions as bidentate ligand, via which the oxygen atom of the deprotonated hydroxyl group and the nitrogen atom of the Schiff's base of the aldehyde group are coordinated.

J. Buey et al. in Chem. Commun., 1999, pp. 441–442, have described the phase behavior of a monocyclic and of a bicyclic chiral palladium (II) complex and of mixtures of these complexes with a nematic host material. The palladium atoms are in each case tetracoordinated; in the monocyclic complex, the coordination of the two different bidentate ligands takes place via a carbon atom and a nitrogen atom or via an oxygen atom and a nitrogen atom. In the bicyclic complex, the palladium centers are linked to one another via a sulfur bridge and a carboxyl bridge, with the other coordinations to the palladium centers in each case being formed via a carbon atom and a nitrogen atom of two identical ligands.

G. Piao et al. in Synthetic Metals, 101, 1999, pp. 92–93, have described the polymerization of acetylene in the presence of a catalyst comprising a chiral titanium compound and triethylaluminum. One of the titanium compounds investigated is a titanium complex in which the metal center is tetracoordinated to two axial-chiral, bidentate (R)- or (S)-6,6'-di(4-(trans-4-n-pentylcyclohexyl)phenoxy-1-hexyl)-2,2'-dihydroxy-1,1'-binaphthyl ligands via the oxygen atoms of the deprotonated hydroxyl groups. The (R)- or (S)-titanium tetrakis(2-octanolate) was investigated as a further titanium compound. In addition, the preparation of chiral nematic phases by mixing the titanium compounds with liquid-crystalline materials is also mentioned.

Investigations by A. F. Drake et al. On the helical twisting power of trisacetylacetonate ("pentane-2,4-dionato") complexes of trivalent cobalt, chromium, ruthenium, iridium and rhodium in liquid-crystalline materials are described in Chem. Phys. Letters, Vol. 110 (6), 1984, pp. 630–633. The central ions of the complex are hexacoordinated via the oxygen atoms of the three bidentate acetylacetonate ligands in each case. Only the type of coordination of the achiral ligands to the central atom provides the metal acetylacetonates described with chirality, which differentiates these compounds from those mentioned previously in which the ligands are themselves already chiral.

It is an object of the present invention to provide further chiral metal compounds which are suitable as dopants for liquid-crystalline materials.

We have found that this object is achieved by the compounds of the formulae IIIa and IIIb described at the outset and by the use of the compounds of the formulae Ia and Ib described at the outset.

The invention covers chiral metal compounds whose chirality is caused by chiral ligands L/L' and by the spatial arrangement of achiral ligands L/L' around the Me center.

The following comments regarding the meanings of the variables $P^1$, $Y^1$ to $Y^3$, $A^1$ and $M^1$ in the compound Ia, the variants $P^1$, $P^2$, $Y^1$ to $Y^6$, $A^1$, $A^2$, $M^1$ and $M^2$ in the compound Ib and the variables $P^2$, $Y^4$ to $Y^6$, $A^2$ and $M^2$ in the compound IIIb are of course only of relevance if the variables n or n and n' or n' respectively in the corresponding formulae adopt the value 1.

Possible spacers $A^1$ or $A^1$ and $A^2$ in the compounds Ia, Ib, IIIa and IIIb are all groups known to the person skilled in the art for this purpose. In general, the spacers contain from one to 30, preferably from one to 12, particularly preferably from one to six, carbon atoms and consist predominantly of linear aliphatic groups. They may be interrupted in the chain, for example by non-adjacent oxygen or sulfur atoms or imino or alkylimino groups, for example methylimino groups. Possible substituents for the spacer chain are also fluorine, chlorine, bromine, cyano, methyl and ethyl.

Examples of representative spacers are the following:

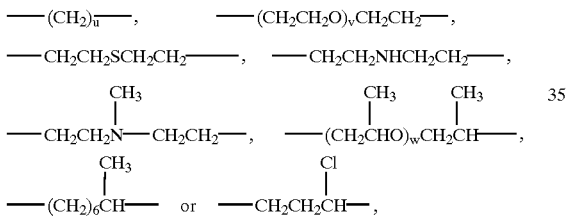

where u is from 1 to 30, preferably from 1 to 12, v is from 1 to 14, preferably from 1 to 5, and w is from 1 to 9, preferably from 1 to 3.

Preferred spacers are ethylene, propylene, n-butylene, n-pentylene and n-hexylene.

The mesogenic groups $M^1$ or $M^1$ and $M^2$ used in the compounds Ia, Ib, IIIa and IIIb can be all groups which are suitable as such to the person skilled in the art.

Particularly suitable are mesogenic groups having the general structure IV $$(-T-Y^7)_r-T-\quad\quad (IV)$$

where the variables have the following meanings:
T is a divalent, saturated or unsaturated carbocyclic or heterocyclic radical,
$Y^7$ is a chemical bond, —O—, —S—, —Co—, —CO—O—, —O—CO—, —CO—N(R)—, —(R)N—CO—, —O—CO—O—, —O—CO—N(R)—, —(R)N—CO—O— or —(R)N—CO—N(R)—, and
r has a value of 0, 1, 2 or 3, where for r>0, both the radicals T and the groups $Y^7$ may be identical or to different from one another.

The radicals T may be ring systems which are substituted by fluorine, chlorine, bromine, cyano, hydroxyl, formyl, nitro, $C_1$–$C_{20}$-alkyl, $C_1$–$C_{20}$-alkoxy, $C_1$–$C_{20}$-alkoxycarbonyl, $C_1$–$C_{20}$-monoalkylaminocarbonyl, $C_1$–$C_{20}$-alkylcarbonyl, $C_1$–$C_{20}$-alkylcarbonyloxy or $C_1$–$C_{20}$-alkylcarbonylamino. Preferred radicals T are the following:

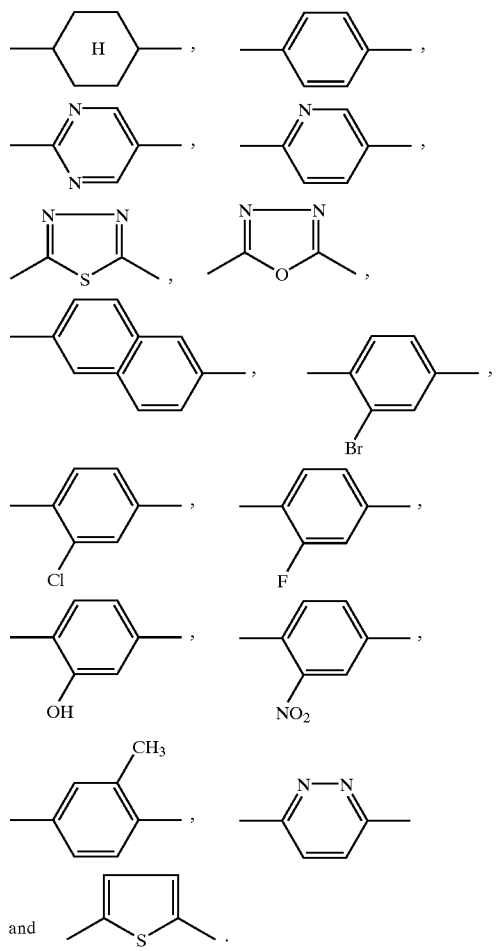

Examples of suitable mesogenic groups $M^1$ or $M^1$ and $M^2$ are the following:

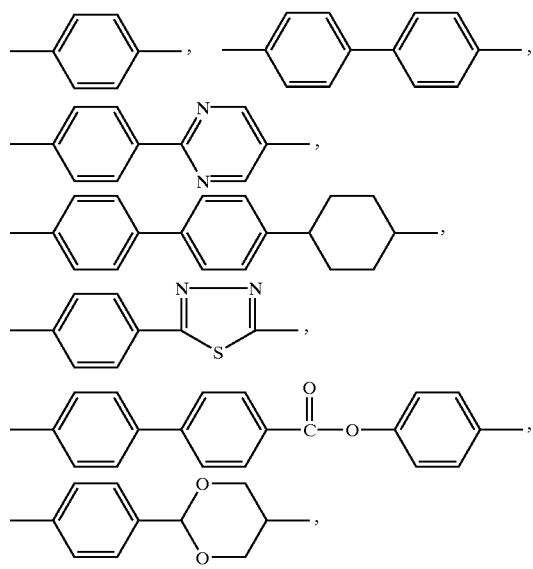

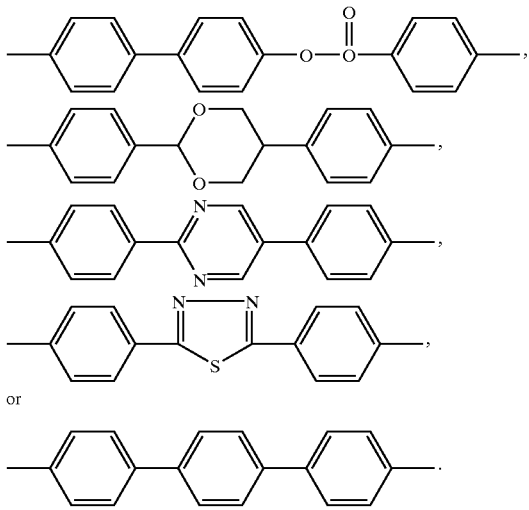

Further possible mesogenic groups $M^1$ or $M^1$ and $M^2$ comply with the following formulae:

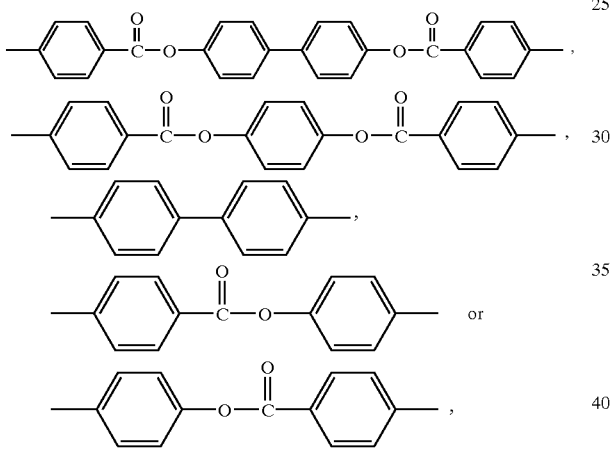

The (unsubstituted) mesogenic groups indicated above may of course, corresponding to the abovementioned examples of possible radicals T, also be substituted by fluorine, chlorine, bromine, cyano, hydroxyl, formyl, nitro, $C_1$–$C_{20}$-alkyl, $C_1$–$C_{20}$-alkoxy, $C_1$–$C_{20}$-alkoxycarbonyl, $C_1$–$C_{20}$-monoalkylaminocarbonyl, $C_1$–$C_{20}$-alkylcarbonyl, $C_1$–$C_{20}$-alkylcarbonyloxy or $C_1$–$C_{20}$-alkylcarbonylamino. Preferred substituents are, in particular, short-chain aliphatic radicals, such as methyl, ethyl, n-propyl, i-propyl, n-butyl, i-butyl, sec-butyl, tert-butyl, and alkoxy, alkoxycarbonyl, alkylcarbonyl, alkylcarbonyloxy, alkylcarbonylamino and monoalkylaminocarbonyl radicals which contain these alkyl groups.

$C_1$–$C_{12}$-alkyl radicals which may be mentioned for $P^1$ or $P^1$ and $P^2$ in the compounds Ia, Ib, IIIa and IIIb are branched or unbranched $C_1$–$C_{12}$-alkyl chains, for example methyl, ethyl, n-propyl, 1-methylethyl, n-butyl, 1-methylpropyl-, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, 2-ethylhexyl, n-nonyl, n-decyl, n-undecyl and n-dodecyl.

Preferred alkyl radicals for $P^1$ or $P^1$ and $P^2$ are the branched or unbranched $C_1$–$C_6$-alkyl chains, for example methyl, ethyl, n-propyl, 1-methylethyl, n-butyl, 1-methylpropyl-, 2-methylpropyl, 1,1-dimethylethyl, n-pentyl, 1-methylbutyl, 2-methylbutyl, 3-methylbutyl, 2,2-dimethylpropyl, 1-ethylpropyl and n-hexyl.

Suitable groups which are polymerizable or suitable for polymerization or suitable radicals which carry a group which is polymerizable or suitable for polymerization (such groups are also referred to below as "reactive radicals") for $P^1$ or $P^1$ and $P^2$ are the following:

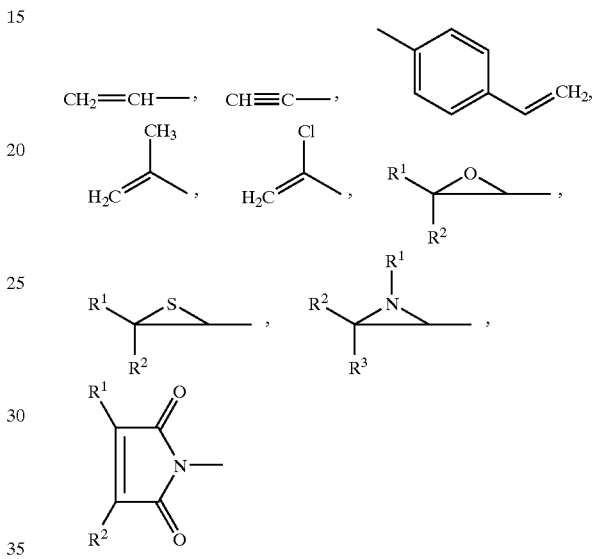

—N=C=O, —N=C=S, —O—C≡N, —COOH, —OH or $NH_2$ where the radicals $R^1$ to $R^3$ may be identical or different and are hydrogen or $C_1$–$C_4$-alkyl, such as methyl, ethyl, n-propyl, isopropyl, n-butyl, isobutyl, sec-butyl or tert-butyl.

Of the polymerizable groups, the cyanates can trimerize spontaneously to give cyanurates. The other groups mentioned require further compounds containing complementary reactive groups for polymerization. Thus, for example, isocyanates can polymerize with urethanes and with amines to give urea derivatives. An analogous situation applies to thiiranes and aziridines. Carboxyl groups can condense to form polyesters and polyamides. The maleimido group is particularly suitable for free-radical copolymerization with olefinic compounds, for example styrene or compounds containing styrene structural units.

The complementary reactive radicals here, together with the reactive radicals corresponding to them, may be present in one and the same compound Ia, Ib, IIIa or IIIb (meaning that this compound can potentially also polymerize with itself) or in a further compound Ia, Ib, IIIa or IIIb. However, these complementary reactive radicals may also, together with the corresponding reactive radicals, be present in one and the same (auxiliary) compounds or in further (auxiliary) compounds of this type.

Polymerizable groups which should be particularly emphasized are the acrylate, methacrylate and vinyl radicals.

Me is a transition metal from the fourth, fifth or sixth period, with the exception of technetium, silver, cadmium, gold, mercury and the lanthanoids, or Me is a main-group element from group 14 (in the IUPAC system), with the exception of carbon and lead. In particular, Me is titanium, chromium, manganese, iron, cobalt, copper, zirconium, molybdenum, ruthenium, rhodium or tungsten, or silicon.

The tridentate ligand L conforms to the general formula II

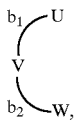
(II)

in which U, V and W are nitrogen-, oxygen-, phosphorus- or sulfur-containing groups which have a nitrogen, oxygen, phosphorous or sulfur atom respectively having at least one free electron pair via which the coordination to the central ion Me takes place.

The compounds of the formulae Ia, Ib, IIIa and IIIb preferably contain ligands L in which V in the formula II is a nitrogen-containing group.

The compounds of the formulae Ia, Ib, IIIa and IIIb particularly preferably contain ligands L in which V in the formula II is a nitrogen-containing group, and U and W are either both an oxygen- or phosphorus-containing group or one of the groups U and V is an oxygen-containing group and the other is a nitrogen-containing group, i.e. the formula II breaks down in this particularly preferred case into the following formulae:

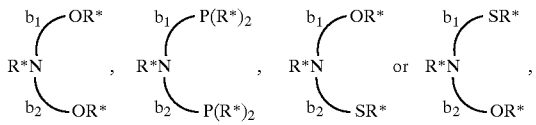

where R*N, OR*, SR* and P(R*)$_2$ are generally nitrogen-, oxygen-, sulfur- or phosphorus-containing groups. It should be noted here that R* can also be a second bond within the bridge b$_1$ or b$_2$, which means that, for example, R*N may also correspond to an imino group —N=.

According to the condition that the metal compounds Ia, Ib, IIIa and IIIb should be uncharged, the nitrogen-, oxygen-, sulfur- or phosphorus-containing groups must carry corresponding formal charges or it must be possible for the corresponding groups to be converted into those having the requisite formal charge, so that, where appropriate taking into account radicals L', neutralization of the charges at the central ion Me results.

b$_1$ and b$_2$ in the formula II correspond to alkylene or alkenylene bridges having two or three carbon atoms which are bonded to the nitrogen, oxygen, phosphorus or sulfur atom of the groups U and V (for b$_1$) or of the groups V and W (for b$_2$) and which, in the case of a C$_2$-alkenylene bridge, may be substituted by up to two, in the other cases by up to four organic radicals having up to 12 carbon atoms, and in which two adjacent carbon atoms in the alkylene or alkenylene bridge may be part of an unsubstituted or substituted, simple or benzo-fused benzene ring.

Examples which may be mentioned of possible organic radicals having up to 12 carbon atoms of this type, but also of the meaning of L', are branched and unbranched alkyl radicals, such as methyl, ethyl, n-propyl, iso-propyl, n-butyl, sec-butyl, isobutyl, tert-butyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, 2-ethylhexyl, n-nonyl, n-decyl, n-undecyl and n-dodecyl, but also cycloalkyl radicals having branched or unbranched alkyl chains, for example cyclopropyl, cyclobutyl, cyclopentyl, cyclohexyl, cycloheptyl, 1-methylcyclopropyl, 1-ethylcyclopropyl, 1-propylcyclopropyl, 1-butylcyclopropyl, 1-pentylcyclopropyl, 1-methyl-1-butylcyclopropyl, 1,2-dimethylcyclopropyl, 1-methyl-2-ethylcyclopropyl, cyclooctyl, cyclononyl or cyclodecyl.

Furthermore, organic radicals having up to 12 carbon atoms of this type, but also the meaning of L', may also be taken to mean, for example, branched and unbranched alkenyl radicals such as vinyl, propenyl, isopropenyl, 1-butenyl, 2-butenyl, 1-pentenyl, 2-pentenyl, 2-methyl-1-butenyl, 2-methyl-2-butenyl, 3-methyl-1-butenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl and 2-dodecenyl, but also cycloalkenyl radicals having branched or unbranched chains with one or more double bonds, for example cyclopropenyl, cyclobutenyl, cyclopentenyl, cyclopentadienyl, cyclohexenyl, 1,3-cyclohexadienyl, 1,4-cyclohexadienyl, cycloheptenyl, cycloheptatrienyl, cyclooctenyl, 1,5-cyclooctadienyl, cyclooctatetraenyl, cyclononenyl or cyclodecenyl.

The organic radicals having up to 12 carbon atoms of this type are preferably C$_6$–C$_{12}$-aryl radicals or C$_7$–C$_{12}$-arylalkyl radicals which are unsubstituted or substituted by alkyl radicals. The former radicals include, in particular, phenyl which is unsubstituted or substituted by methyl, ethyl, n-propyl, isopropyl, n-butyl, sec-butyl, isobutyl or tert-butyl, or naphthyl which is unsubstituted or substituted by methyl, and the latter radicals include, in particular, phenylmethyl, 2-phenylethyl, 3-phenylpropyl or 4-phenylbutyl, each of which is unsubstituted or substituted on the benzene ring by methyl, ethyl, n-propyl, isopropyl, n-butyl, sec-butyl, isobutyl or tert-butyl.

L', by contrast, is preferably methyl, tert-butyl or phenyl which is unsubstituted or substituted by methyl, ethyl, n-propyl, isopropyl, n-butyl, sec-butyl, isobutyl or tert-butyl.

Possible tridentate chiral ligands L which do not contain P$^1$—Y$^1$—A$^1$—Y$^2$—M$^1$—Y$^3$— groups, i.e. for which n adopts a value of 0, conform to the formula

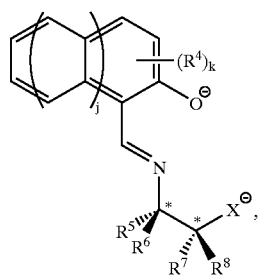

in which the variables have the following meanings:
j is 0, 1 or 2,
k is 0, 1, 2 or 3,
X is oxygen or sulfur,
R$^4$ is methyl, ethyl, n-propyl, isopropyl, n-butyl, sec-butyl, isobutyl or tert-butyl, halogen, for example chlorine or bromine, nitro, cyano, carboxyl or sulfonyl, where, in the case where k is 2, the two radicals $R^4$ may be identical or different.

$R^5$ to $R^8$ are hydrogen, $C_6$–$C_{12}$-aryl, for example phenyl, phenyl which is substituted by methyl, ethyl, n-propyl, isopropyl, n-butyl, sec-butyl, isobutyl or tert-butyl, naphthyl or naphthyl which is substituted by methyl, $C_7$–$C_{12}$-arylalkyl, for example phenylmethyl, 2-phenylethyl, 3-phenylpropyl or 4-phenylbutyl or phenylmethyl, 2-phenylethyl, 3-phenylpropyl or 4-phenylbutyl, each of which is substituted by methyl, ethyl, n-propyl, isopropyl, n-butyl, sec-butyl, isobutyl or tert-butyl, with the proviso that the radicals $R^5/R^6$ or $R^7/R^8$ in at least one of the radical pairs $R^5$ and $R^6$ and $R^7$ and $R^8$ are different from one another and accordingly at least one of the marked carbon atoms (*) is a center of asymmetry.

Examples of such ligands L are the following (Ph denotes the phenyl radical):

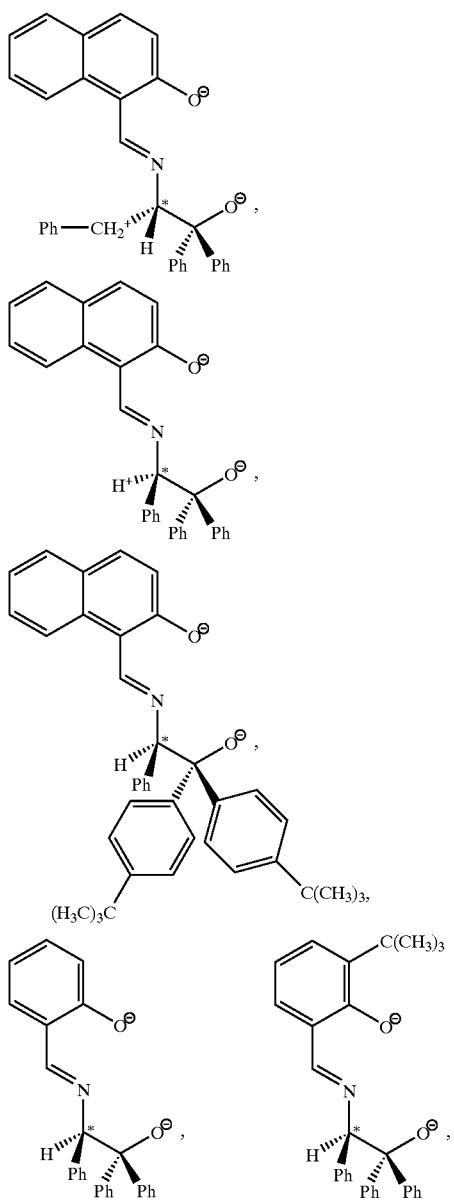

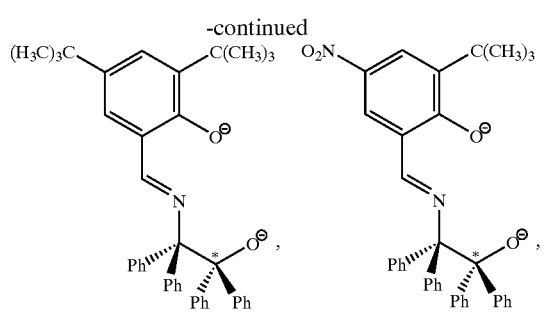

and the corresponding enantiomeric compounds.

In the case of the compounds of the formula Ib and the preferred embodiments mentioned above, use is preferably made in accordance with the invention of those in which n' adopts the value 0 for all m L'(—$Y^6$—$M^2$—$Y^5$—$A^2$—$Y^4$—$P^2$)$_{n'}$ groups. Use is thus preferably made of compounds of the formula

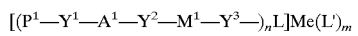

An analogous situation also applies to the compounds of the formula IIIb and their preferred embodiments mentioned above. Preference is accordingly given here to compounds of the formula

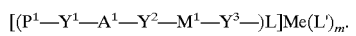

In accordance with the invention, the compounds of the formulae Ia and Ib and also IIIa and IIIb and their preferred embodiments are used as chiral dopants for liquid-crystalline materials. The term "liquid-crystalline materials" here is not restricted only to materials in which one or more constituents already have liquid-crystalline properties per se (in the temperature range of interest) and are then also present in the materials, but instead is also taken to mean materials in which liquid-crystalline behavior does not manifest itself until all the components are mixed or alternatively until the chiral compound(s) Ia, Ib, IIIa and IIIb are admixed (for example lyotropic systems). It should furthermore be noted here that the compounds Ia, Ib, IIIa and IIIb need not necessarily already have liquid-crystalline behavior themselves.

Also claimed are liquid-crystalline materials which comprise at least one compound of the formula Ia or Ib to be used in accordance with the invention or at least one compound IIIa or IIIb (also referred to below as "doped LC materials" or "LC materials (according to the invention)").

Depending on the specific requirements, these LC materials may contain no, few or many groups which are polymerizable or suitable for polymerization or radicals which carry groups which are polymerizable or suitable for polymerization in the compounds Ia, Ib, IIIa or IIIb and/or the liquid-crystalline base material. Corresponding to the number of reactive radicals of this type in the constituents in the LC materials according to the invention, it is possible to set the desired degree of polymerization, crosslinking and/or condensation after the polymerization or condensation has taken place.

The polymerizable LC materials according to the invention can generally be prepared by mixing polymerizable, liquid-crystalline materials with one or more of the compounds Ia, Ib, IIIa and/or IIIb in a simple manner. Suitable polymerizable, liquid-crystalline compounds are described, for example, in WO 95/22586, 95/24454, 95/24455, 96/04351, 96/24647, 97/00600, 97/34862 and 98/47979 and DE-A 198 35 730 and essentially correspond to the schematic structure P—Y—A—Y—M—Y—A—Y—P, in which the variables P, Y, A and M have analogous meanings to the variables $P^1/P^2$, $Y^1$ to $Y^6$, $A^1/A^2$ and $M^1/M^2$ in the formulae Ia, Ib, IIIa and IIIb.

These LC materials according to the invention can serve for the production of optical components, for example LCDs, polarizers or filters.

Furthermore, these LC materials according to the invention can be used for printing or coating substrates. In this case, further additives may also be present. Suitable such additives are those selected from the group consisting of photoinitiators, reactive diluents and diluents, additives selected from the group consisting of antifoams and deaerators, lubricants and flow auxiliaries, thermally curing or radiation-curing auxiliaries, substrate-wetting auxiliaries, wetting and dispersion aids, hydrophobicizing agents, adhesion promoters and auxiliaries for improving the scratch resistance, additives selected from the group consisting of dyes and pigments, and additives selected from the group consisting of light, heat and/or oxidation stabilizers.

The chemical/physical nature of these additives is discussed in detail in the earlier German application 199 05 394.4. Furthermore, this specification describes liquid-crystalline mixtures, as which the LC materials according to the invention, if desired mixed with the abovementioned additives, are also to be mentioned. The doped LC materials claimed in the present application, if desired mixed with said additives, can accordingly, as stated in the earlier German specification 199 05 394.4, be employed as printing and coating compositions for substrates.

Suitable printing or coating substrates, besides paper and board products, for example for carrier bags, newspapers, brochures, gift packaging and packaging materials for utility, semi-luxury and luxury products, are also films, for example for decorative and non-decorative packaging purposes, and textiles of all types and leather.

However, further substrates are also (consumer) electronic products, for example MC, MD, DVD and video recorders, televisions, radios, telephones/cellphones, etc., and computer equipment, products from the leisure, sports, domestic and toy sector, for example bicycles, children's toys, skis, snowboards and surfboards, inline skates and roller-skating and ice-skating boots, and also domestic appliances. In addition, substrates of this type are also taken to mean, for example, writing utensils and spectacle frames.

However, further substrates are also surfaces to be encountered in the construction sector, such as building walls or even window panes. In the latter case, a functional effect may also be desired in addition to a decorative effect. It is thus possible to produced multilayer coatings on the window material, with the individual layers having different chemical/physical properties. For example, if individual layers of the doped LC materials of opposite twist (through use of the one enantiomer and its optical antipode as dopant in accordance with the present invention) or individual layers of crosslinked, doped LC materials of the same twist direction, but in each case different pitch and thus different reflection properties (through the use of different concentrations of dopant in accordance with the present invention) are applied, certain wavelengths or wavelength ranges of the light spectrum can be reflected specifically. Regarding this aspect of the LC materials according to the invention, especially thermal insulation coatings, reference is also made to DE-A 197 45 647.

The LC materials according to the invention can also be used for the preparation of dispersions and emulsions, preferably based on water. In this respect, reference is made to WO 96/02597 and WO 98/47979, in which the preparation of dispersions and emulsions using liquid-crystalline materials is described.

The LC materials according to the invention can furthermore be used for the production of films. These are taken to mean, in particular, self-supporting layers, as obtained by polymerization of the doped LC materials of corresponding nature. These films may be located on substrates of such a type that it is possible for them to be easily detached and transferred to other substrates to remain there permanently through suitable measures.

Such films can be used, for example, in the area of film coating and in lamination processes.

The LC materials according to the invention are also suitable for the preparation of pigments. In this case, use is made, in particular, of materials which contain a large number of reactive radicals and thus form highly crosslinked polymers. The preparation of such pigments is known and is described in detail in the specification WO 99/11733. In addition, however, pigments of preset shape and size can be prepared using printing techniques with the aid of meshes in whose interspaces the LC materials according to the invention are located. The subsequent polymerization or condensation of the materials is followed here by detachment or removal of the substrate from the mesh. These procedures are described in detail in the specifications WO 96/02597, WO 97/27251, WO 97/27252 and EP 0 931 110.

The polymerizable LC materials are converted into polymers having a frozen liquid-crystalline ordered structure with the aid of their reactive radicals and, depending on their chemical nature, through condensation or free-radical or ionic polymerization processes, which may be initiated by photochemical reactions.

These pigments may be single-layered (homogeneous) or have a multilayered structure. However, the latter pigments can usually only be prepared if use is made of coating processes in which a plurality of layers are generated successively one on top of the other and subsequently subjected to mechanical comminution.

These pigments are used principally in cosmetics, for example for the production of eye-shadow, and in paints for the automobile and leisure sectors.

EXAMPLES

A) Preparation of the Chiral Metal Compounds

The chiral metal compounds were prepared as shown in equations 1 to 4 shown below and the corresponding steps 1 to 4.

Equation 1:

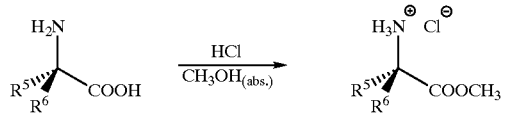

Step 1: Preparation of methyl (2R)-2-amino-2-phenylacetate hydrochloride (corresponding to equation 1 where $R^5$ is hydrogen, $R^6$ is phenyl; compound 1a)

50.2 g (332 mmol) of (2R)-2-amino-2-phenylacetic acid (Fluka) were introduced into a 1 l three-necked flask fitted with stirrer, reflux condenser and gas-inlet tube with frit, and the flask was flushed vigorously with nitrogen for 20 minutes with the aid of a three-way stopcock and two wash bottles. The starting material was then suspended in 250 ml of absolute methanol in a counterstream of nitrogen. After the mixture had been cooled to 0° C., the three-way stopcock was switched from nitrogen to hydrogen chloride gas, and the latter was passed in to the saturation point. The batch was allowed to warm to room temperature over the course of one hour. The original suspension gave rise to a clear solution, which was subsequently refluxed for three hours.

In order to evaporate the methanol, the solution was left to stand uncovered in a crystallization dish overnight, and the resultant solid was washed with diethyl ether and recrystallized from methanol/diethyl ether (1:1). Drying at 50° C. in a high vacuum gave the desired product in a yield of 58.0 g (87%).

Besides compound 1a, Table 1 shows compounds 1b and 1c prepared analogously.

TABLE 1

| Starting material | Product | Product designation |
| --- | --- | --- |
| (R)-2-amino-2-phenyl acetic acid (Aldrich) | Methyl (R)-2-amino-2-phenyl acetate hydrochloride | Compound 1a |
| (S)-2-amino-2-phenyl acetic acid (Aldrich) | Methyl (S)-2-amino-2-phenyl acetate hydrochloride | Compound 1b |
| (S)-2-amino-2-benzyl acetic acid (Aldrich) | Methyl (S)-2-amino-2-benzyl acetate hydrochloride | Compound 1c |

Equation 2:

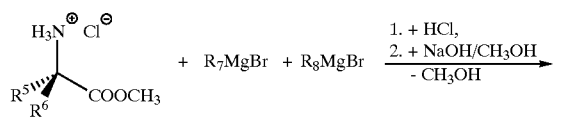

Step 2: Preparation of (2R)-2-amino-1,1,2-triphenylethanol (correspondingly $R^5$ is hydrogen, $R^6$ to $R^8$ are phenyl in the general formula of the ethanolamine in equation 2; compound 2a)

57.6 g (2.37 mol) of magnesium turnings which had been activated by means of a few iodine crystals were introduced into a 4 l four-necked flask fitted with precision glass stirrer, high-efficiency condenser, nitrogen/vacuum connection, stopper and 1 l dropping funnel (with pressure equalization). The turnings were then suspended in 100 ml of absolute diethyl ether, 10.6 g (0.068 mol) of freshly distilled bromobenzene (Aldrich) in undiluted form were added in order to initiate the Grignard reaction, and the mixture was heated locally using a hair dryer. After commencement of the reaction, a further 370.6 g (2.36 mol) of freshly distilled bromobenzene in 500 ml of diethyl ether were added dropwise over the course of three hours at such a rate that the solution boiled gently. When the addition was complete, the mixture was stirred at room temperature for a further three hours.

The solution was cooled to 0° C., and the solid hydrochloride (237 g, 1.18 mol) was added at such a rate that the internal temperature did not exceed 5° C. When the addition was complete, the entire solution was stirred at room temperature for a period of seven hours.

For hydrolysis, the solution was slowly poured onto 2.0 kg of ice, 500 ml of semi-concentrated hydrochloric acid were then carefully added, and the mixture was stirred vigorously for one hour. The resultant hydrochloride of the desired product was filtered off with suction by means of a porcelain suction filter, washed with diethyl ether, dissolved in a 2 N solution of sodium hydroxide in methanol and concentrated under reduced pressure.

The residue was diluted with 2 l of dichloromethane and 1 l of water, and—after phase separation—the organic phase was extracted three times with 500 ml of water each time. The combined organic phases were dried over anhydrous magnesium sulfate, filtered and evaporated in a rotary evaporator. Recrystallization of the resultant solid from 75 ml of toluene gave the desired pure product in a yield of 54.9 g (66%) as a white powder which should be stored at −18° C.

Besides compound 2a, Table 2 shows compounds 2b to 2d prepared analogously.

TABLE 2

| Starting materials | Product | Product designation |
| --- | --- | --- |
| Compound 1a/ bromobenzene (Aldrich) | (2R)-2-Amino-1,1,2-triphenylethanol | Compound 2a |
| Compound 1b/ bromobenzene (Aldrich) | (2S)-2-Amino-1,1,2-triphenylethanol | Compound 2b |
| Compound 1a/ 4-tert-butylbromobenzene (Aldrich) | (2R)-2-Amino-1,1-bis (4-tert-butylphenyl)-2-phenylethanol | Compound 2c |
| Compound 1c/ bromobenzene (Aldrich) | (2S)-2-Amino-2-benzyl-1,1-diphenylethanol | Compound 2d |

Preparation of (1R)-2-amino-1,2,2-triphenylethanol (compound 2 g) in accordance with equations 2(i) to 2(iv)

Equation 2(i):

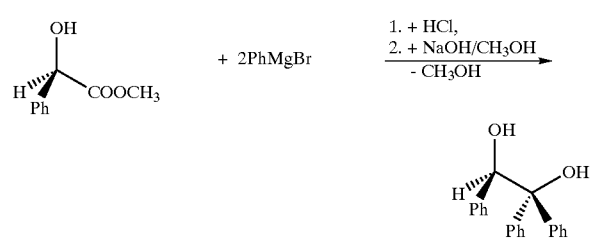

Step 2(i): Preparation of (2R)-1,1,2-triphenyl-1,2-ethanediol 40 g (1.65 mol) of magnesium turnings which were activated by means of a few iodine crystals were introduced into a 2 l four-necked flask fitted with precision glass stirrer, high-efficiency condenser, nitrogen/vacuum connection, stopper and 1 l dropping funnel (with pressure equalization). The turnings were then suspended in 100 ml of absolute diethyl ether, 5 ml (0.045 mol) of freshly distilled bromobenzene (Aldrich) in undiluted form were added in order to initiate the Grignard reaction, and the mixture was heated locally using a hair dryer. After commencement of the reaction, a further 185 ml (1.67 mol) of freshly distilled bromobenzene in 325 ml of diethyl ether were added dropwise over the course of three hours at such a rate that the solution boiled gently. When the addition was complete, the mixture was stirred at room temperature for a further one hour.

The solution was cooled to 0° C., and methyl (R)-mandelate (49.9 g; 0.3 mol) in 300 ml of absolute diethyl ether was added at such a rate that the internal temperature did not exceed 5° C. When the addition was complete, the entire solution was stirred at room temperature for a period of four hours.

For hydrolysis, the solution was slowly poured onto 500 g of ice, and then 0.5% strength hydrochloric acid was carefully added to a pH of 6. The organic phase was separated off, and the aqueous phase was extracted three times with methylene chloride (125 ml). After drying over magnesium sulfate, the organic phases were evaporated, and the crude product was recrystallized from methanol. The yield was 57 g (65%).

Equation 2(ii):

Step 2(ii): Preparation of (5R)-4,4,5-triphenyl-1,3,2-dioxathiolane 2-oxide 22.3 g (76.9 mmol) of (2R)-1,1,2-triphenylethanediol in 1.5 ml of dichloromethane were introduced into a 4 l four-necked flask fitted with magnetic stirrer, high-efficiency condenser, nitrogen/vacuum connection, serum cap and 500 ml dropping funnel (with pressure equalization). After 23.5 ml (169.2 mmol) of freshly distilled triethylamine had been added, the solution was cooled to 0° C., and 5.6 ml (76.9 ml) of thionyl chloride in 400 ml of dichloromethane were added dropwise. When the addition was complete, the mixture was refluxed with stirring for a further six hours.

The solution was evaporated in a rotary evaporator and taken up in 400 ml of tetrahydrofuran, and the precipitate was filtered off with suction. The organic phase was evaporated in a rotary evaporator, and the product was chromatographed over a column (n-hexane/ethyl acetate 5:1) and finally dried in a high vacuum. The yield was 88%.

Equation 2(iii):

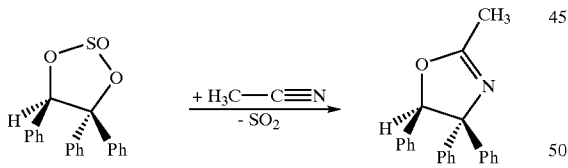

Step 2(iii): Preparation of (5R)-2-methyl-4,4,5-triphenyloxazoline 19 g (56.5 mmol) of (5R)-4,4,5-triphenyl-1,3,2-dioxathiolane 2-oxide in 90 ml of acetonitrile were introduced into a 250 ml three-necked flask fitted with magnetic stirrer, nitrogen/vacuum connection and 25 ml dropping funnel (with pressure equalization). After the mixture had been cooled to 0° C., 10 ml (113 mmol) of trifluoromethanesulfonic acid were added. The mixture was subsequently stirred at room temperature for a further sixteen hours. The solid by-product formed was filtered off with suction and rinsed with n-hexane, and the mother liquor was adjusted to a pH of 8 using sodium hydroxide solution (2.5 N) and finally freed from organic solvent in a rotary evaporator. After taking-up in dichloromethane, the product solution was dried over magnesium sulfate. After removal of the dichloromethane, the product was isolated in a yield of 64%.

Equation 2 (iv):

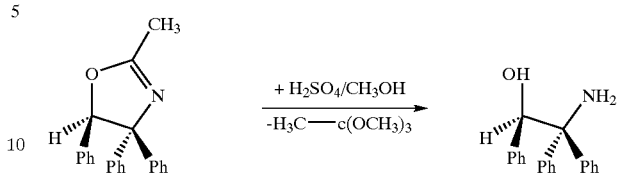

Step 2(iv): Preparation of (1R)-2-amino-1,2,2-triphenylethanol (correspondingly $R^7$ is hydrogen and $R^5$, $R^6$ and $R^8$ are phenyl in the general formula of the ethanolamine in equation 2; compound 2g)

11.2 g (35.7 mmol) of (5R)-2-methyl-4,4,5-triphenyloxazoline in 340 ml of 12% strength sulfuric acid/methanol solution were introduced into a 1 l one-necked flask fitted with magnetic stirrer and reflux condenser, and the solution was held at the boiling point for 10 days. After 250 ml of water had been added and the methanol had been removed by distillation, the solid was extracted with diethyl ether (100 ml). The aqueous phase was adjusted to a pH of 11 using sodium hydroxide solution, and the product was extracted with dichloromethane. Removal of the solvent and recrystallization from toluene gave the product (compound 2 g) in a yield of 88%.

Equation 3:

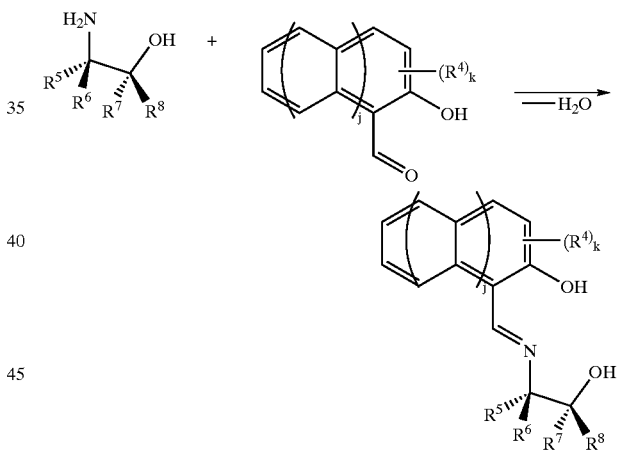

Step 3: Preparation of the Schiff's base of β-hydroxynaphthyl aldehyde and (2R)-2-amino-,1,1,2-triphenylethanol (corresponding to the product in equation 3 with $R^5$ being hydrogen, $R^6$ and $R^8$ being phenyl, j being 1 and k being 0; compound 3a)

4.34 g (15.0 mmol) of (2R)-2-amino-1,1,2-triphenylethanol and 4.3 g (30.3 mmol) of anhydrous sodium sulfate were introduced into a 250 ml three-necked flask fitted with magnetic stirrer, two septums and nitrogen/vacuum connection. 40 ml of absolute methanol and 40 ml of absolute dichloromethane were added to the batch by means of a syringe.

15.75 mmol (1.05 equivalents) of β-hydroxynaphthylaldehyde (Fluka) were introduced into a 100 ml pear-shaped flask with septum and nitrogen/vacuum connection, and 50 ml of absolute methanol were added, the resultant solution changing color to orange due to the formation of phenoxide.

The solution of (2R)-2-amino-1,1,2-triphenylethanol was cooled to −20° C., and the aldehyde solution was very slowly added dropwise by means of a cannula via the septum. A spontaneous yellow coloration of the reaction mixture occurred. The temperature of the mixture was monitored via a PT resistance thermometer introduced through the septum and was not to exceed a value of −18° C.

When the aldehyde addition was complete, the mixture was filtered at 0° C., and the filtrate was freed from solvent at 0° C. by condensation. The solid which remained was recrystallized from pentane, and the pale-yellow product obtained was dried in an oil-pump vacuum.

Diastereomer mixtures were resolved by column chromatography using various hexane/ethyl acetate mixtures.

Preparation of 3-tert-butyl-2-hydroxybenzaldehyde

Equation 3 (i):

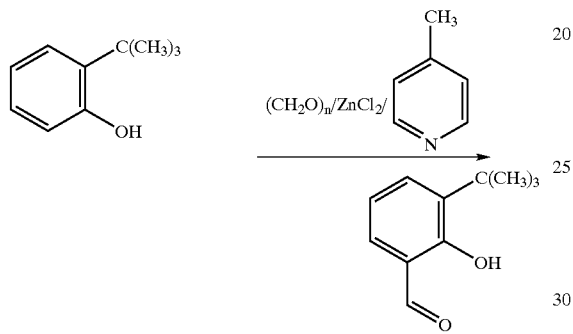

9.0 g (300 mmol) of para-formaldehyde in 200 ml of toluene were introduced into a 500 ml three-necked flask fitted with magnetic stirrer, reflux condenser and nitrogen/vacuum connection, and 15.4 ml (100 mmol) of 2-tert-butylphenol (Aldrich), 3.9 ml (40 mmol) of 4-methylpyridine and 1.89 g (10 mmol) of tin(II) chloride were added. The batch was subsequently allowed to stir at 95° C. for six hours. The isolated product was taken up in diethyl ether, and the solution was washed with sodium chloride solution, dried over sodium sulfate and evaporated in a rotary evaporator, giving the product in a yield of 39.5%.

Preparation of 3-tert-butyl-2-hydroxy-5-nitrobenzaldehyde

Equation 3 (ii):

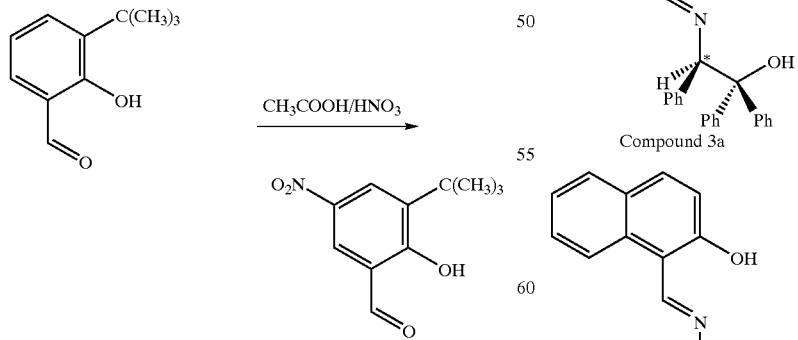

5.0 g (28 mmol) of 3-tert-butyl-2-hydroxybenzaldehyde in 8 ml of glacial acetic acid were introduced into a 50 ml two-necked flask fitted with magnetic stirrer and dropping funnel, and 2.8 ml (68 mmol) of nitric acid were added at a temperature of below 5° C. The batch was subsequently stirred further at room temperature for one hour. The product was isolated by precipitation on ice and washed with water. After recyrstallization of the methanol, the product was dried. The yield was 64%.

Table 3 shows the starting materials for compound 3a and the compounds 3b to 3h prepared analogously. The pictorial formulae of compounds 3a to 3h are shown below in Table 3.

TABLE 3

| Starting materials | Product designation |
|---|---|
| Compound 2a/β-hydroxynaphthylaldehyde (Aldrich/Fluka) | Compound 3a |
| Compound 2b/β-hydroxynaphthylaldehyde (Aldrich/Fluka) | Compound 3b |
| Compound 2c/β-hydroxynaphthylaldehyde (Aldrich/Fluka) | Compound 3c |
| Compound 2d/β-hydroxynaphthylaldehyde (Aldrich/Fluka) | Compound 3d |
| Compound 2a/β-hydroxybenzaldehyde (Aldrich/Fluka) | Compound 3e |
| Compound 2a/3-tert-butyl-2-hydroxybenzaldehyde (prepared in accordance with equation 3(i)) | Compound 3f |
| Compound 2g/2-hydroxy-3,5-di(tert-butyl)benzaldehyde (Aldrich/Lancaster) | Compound 3g |
| Compound 2a/2-hydroxy-3-tert-butyl-5-nitrobenzaldehyde (prepared in accordance with equation 3(ii)) | Compound 3h |

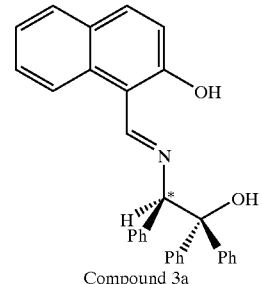

Compound 3a

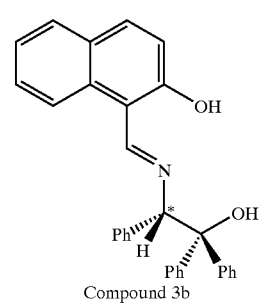

Compound 3b

TABLE 3-continued

| Starting materials | Product designation |
|---|---|

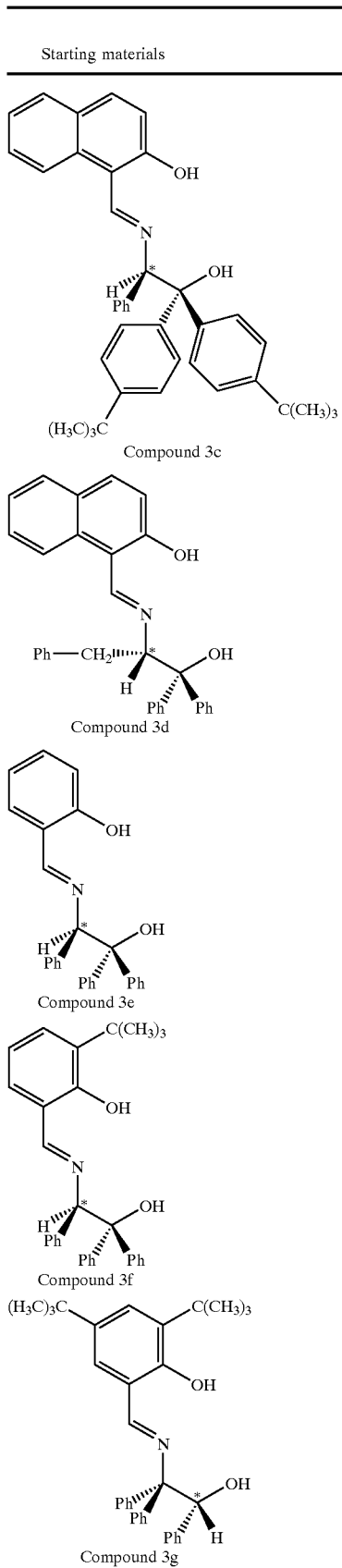

TABLE 3-continued

| Starting materials | Product designation |
|---|---|

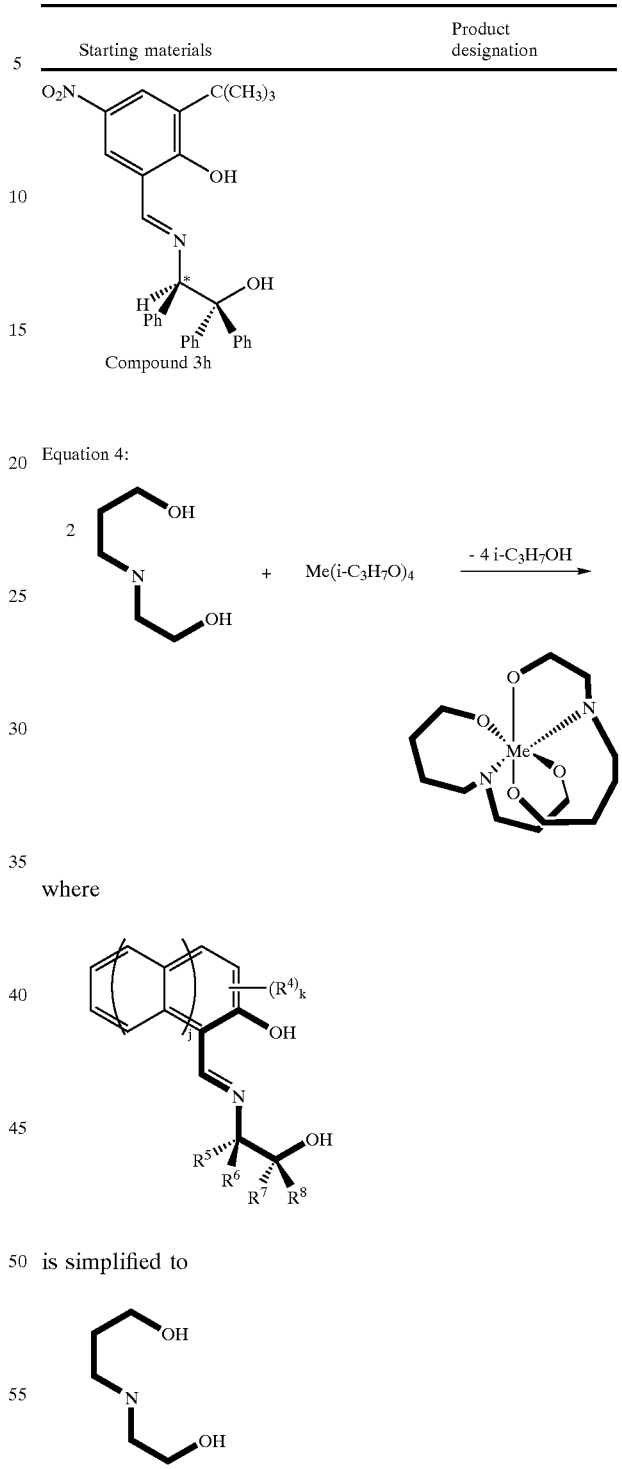

Step 4: General procedure for the preparation of the chiral $L_2Ti$ complexes (corresponding to equation 4 with Me being titanium)

2.05 mmol (2.01 equivalents) of the corresponding ligand L were introduced into a 50 ml two-necked flask fitted with magnetic stirrer, septum and reflux condenser with nitrogen/vacuum connection and dissolved in 6 ml of absolute dichloromethane. After 0.3 ml (1.02 mmol) of freshly distilled titanium tetraisopropoxide (Aldrich) had been injected in at room temperature, the solution was refluxed for four hours.

After the solvent had been removed in a rotary evaporator, the solid which remained was either chromatographed or recrystallized from n-hexane.

The metal compounds 4a to 4h obtained by reaction with compounds 3a to 3h as ligand L conform to the structure shown in equation 4.

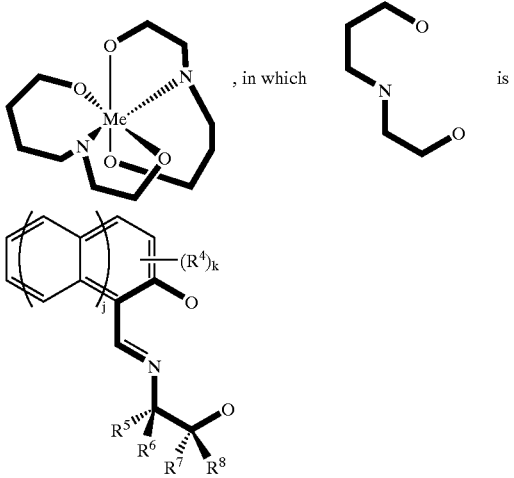

The meanings of variables k, j and $R^4$ to $R^8$ in the individual metal compounds are shown in Table 4.

TABLE 4

| Starting material | Product designation | Meaning of the variables |
|---|---|---|
| Compound 3a | Compound 4a | k = 0, j = 1, $R^5$ hydrogen, $R^6$ to $R^8$ phenyl |
| Compound 3b | Compound 4b | k = 0, j = 1, $R^6$ hydrogen, $R^5$, $R^7$ and $R^8$ phenyl |
| Compound 3c | Compound 4c | k = 0, j = 1, $R^5$ hydrogen, $R^6$ phenyl, $R^7$ and $R^8$ 4-tert-butyl-phenyl |
| Compound 3d | Compound 4d | k = 0, j = 1, $R^5$ benzyl, $R^6$ hydrogen, $R^7$ and $R^8$ phenyl |
| Compound 3e | Compound 4e | k = 0, j = 0, $R^5$ hydrogen, $R^6$ to $R^8$ phenyl |
| Compound 3f | Compound 4f | k = 1, j = 0, $R^4$ 3-tert-butyl, $R^5$ hydrogen, $R^6$ to $R^8$ phenyl |
| Compound 3g | Compound 4g | k = 2, j = 0, $R^4$ 3,5-di(tert-butyl), $R^8$ hydrogen, $R^5$ to $R^7$ phenyl |
| Compound 3h | Compound 4h | k = 2, j = 0, $R^4$ 3-tert-butyl-5-nitro, $R^5$ hydrogen, $R^6$ to $R^8$ phenyl |
| Compound 3i analogous to 3g, but with $R^5$, $R^6$ being hydrogen instead of phenyl | Compound 4i | k = 2, j = 0, $R^4$ 3,5-di (tert-butyl), $R^5$, $R^6$ and $R^8$ hydrogen, $R^7$ phenyl |
| Compound 3k analogous to 3d, but with $R^5$, $R^6$ being phenyl and $R^8$ being hydrogen instead of benzyl, hydrogen and phenyl, respectively | Compound 4k | k = 0, j = 1, $R^5$ to $R^7$ phenyl, $R^8$ hydrogen |

B) Measurements of the Helical Twisting Power (HTP).

Preliminary Remark:

The effect of the chiral dopant on the nematic phase is described by the helical twisting power (HTP), which is defined as follows:

$$HTP = \lim_{x_{ch} \to 0} \left(\frac{dp^{-1}}{dx_{ch}}\right)_{T_*} = \lim_{x_{ch} \to 0} \bar{n}\left(\frac{d\lambda_R^{-1}}{dx_{ch}}\right)_{T_*}$$

where:

p denotes the pitch of the cholesteric helix $x_{ch}$ denotes the molar proportion (mole fraction) of the chiral dopant, $\bar{n}$ denotes the mean refractive index of the cholesteric phase, generally assumed to be about 1.6 for liquid-crystalline phases, $\lambda_R$ denotes the wavelength of the reflected light, and T* denotes the reduced temperature, i.e. the quotient of the measurement temperature $T_M$ and the clearing temperature $T_c$.

For small values of $x_{ch}$, there is to a good approximation a linear dependence of the value of $p^{-1}$ or $\lambda_R-1$ on $x_{ch}$, and consequently the limit value can be used with adequate accuracy of the quotient itself. In this concentration range, the HTP value can be determined by only one $\lambda_R$ measurement if the value of $\lambda_R^{-1}$ for $x_{ch}=0$ is assumed to be zero. The above equation is thus simplified as follows:

$$HTP = \lim_{x_{ch} \to 0} \bar{n}\left(\frac{d\lambda_R^{-1}}{dx_{ch}}\right)_{T_*} \approx \bar{n}\left(\frac{d\lambda_R^{-1}}{dx_{ch}}\right)_{T_*} \approx \bar{n}\left(\frac{\Delta\lambda_R^{-1}}{\Delta x_{ch}}\right)_{T_*} =$$
$$= \bar{n}\left(\frac{\lambda_R^{-1}(x_{ch}) - \lambda_R^{-1}(0)}{x_{ch} - 0}\right)_{T_*} = \bar{n}\left(\frac{\lambda_R^{-1}(x_{ch})}{x_{ch}}\right)_{T_*}$$

The chiral dopants ("DP") investigated were the chiral metal compounds 4a to 4g and, for comparative purposes, in some cases the chiral ligands on which these compounds are based (compounds 3a to 3d).

The liquid-crystalline (nematic) base material ("LC") used for the determination of the HTP values was either the compound of the following formula ("LC1"):

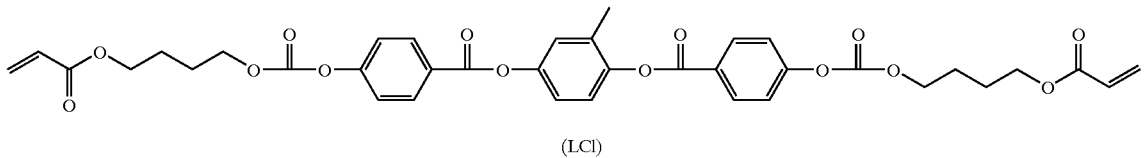

(LC1)

or the commercially available liquid-crystalline product ZLI 1840 (Merck). The preparation of LC1 is given in the specification WO 97/00600 (Example 6). The results of the HTP value measurements are shown in Table 5 below.

TABLE 5

| DP | LC | HTP value | Direction of rotation |
|---|---|---|---|
| 3a | LC1 | 2 $\mu m^{-1}$ | Right |
| 4a | LC1 | 15 $\mu m^{-1}$ | Right |
| 3b | ZLI 1840 | 3 $\mu m^{-1}$ | Left |
| 4b | ZLI 1840 | 43 $\mu m^{-1}$ | Left |
| 3c | LC1 | <2 $\mu m^{-1}$ | Indeterminable |
| 4c | LC1 | 16 $\mu m^{-1}$ | Right |
| 3d | LC1 | 6 $\mu m^{-1}$ | Right |
| 4d | LC1 | 9 $\mu m^{-1}$ | Right |
| 4e | ZLI 1840 | 20 $\mu m^{-1}$ | Right |
| 4f | ZLI 1840 | 2 $\mu m^{-1}$ | Indeterminable |
| 4g | LC1 | 23 $\mu m^{-1}$ | Left |
| 3h | LC1 | <2 $\mu m^{-1}$ | Indeterminable |
| 4i | LC1 | 23 $\mu m^{-1}$ | Not determined |
| 4k | LC1 | 50 $\mu m^{-1}$ | Not determined |

We claim:

1. A method, comprising mixing together at least one liquid crystalline material and at least one chiral, uncharged compound of the general formula Ia

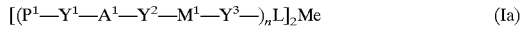

or Ib

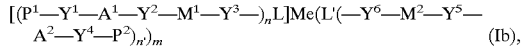

in which, independently of one another, $P^1$ and $P^2$ are hydrogen, $C_1$–$C_{12}$-alkyl, a group which is polymerizable or suitable for polymerization, or a radical which carries a group which is polymerizable or suitable for polymerization, $Y^1$ to $Y^6$ are a single chemical bond, —O—, —S—, —CO—, —CO—O—, —O—CO—, —CO—NCR)—, —(R)N—CO—, —O—CO—O—, —O—CO—N(R)—, —(R)N—CO—O— or —(R)N—CO—N(R)—, R is hydrogen or $C_1$–$C_4$-alkyl, $A^1$ and $A^2$ are spacers having from one to 30 carbon atoms, $M^1$ and $M^2$ are mesogenic groups, n' and n are values of 0 or 1, m is a value of 1, 2 or 3, where the m L'(—$Y^6$—$M^2$—$Y^5$—$A^2$—$Y^4$—$P^2$)$_{n'}$ groups in the formula Ib may be different, Me is a transition metal from the fourth, fifth or sixth period, with the exception of technetium, silver, cadmium, gold, mercury and the lanthanoids, or a main-group element from group 14 (in the TUPAC system), with the exception of carbon and lead, L is a tridentate ligand of the formula II

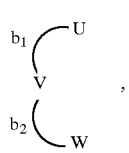

in which

U, V and W are nitrogen-, oxygen-, phosphorus- or sulfur-containing groups which contain a nitrogen, oxygen, phosphorus or sulfur atom respectively having at least one free electron pair via which the coordination to the center Me takes place, $b_1$ and $b_2$ are alkylene or alkenylene bridges having two or three carbon atoms which are bonded to the nitrogen, oxygen, phosphorus or sulfur atom of the groups U and V (for $b_1$) or of the groups V and W (for $b_2$) and which, in the case of a $C_2$-alkenylene bridge, may be substituted by up to two, in the other cases by up to four organic radicals having up to 12 carbon atoms, and in which two adjacent carbon atoms in the alkylene or alkenylene bridge may be part of an unsubstituted or substituted, simple or benzo-fused benzene ring, and L' is an organic radical having up to 12 carbon atoms.

2. The method as claimed in claim 1 in which

Me is a transition metal selected from the group consisting of titanium, chromium, manganese, iron, cobalt, copper, zirconium, molybdenum, ruthenium, rhodium and tungsten or is silicon.

3. The method as claimed in claim 1 in which, in the formula II

V is a nitrogen-containing group.

4. The method as claimed in claim 3 in which,

U and W are either both an oxygen- or phosphorus-containing group or one of the groups U and W is an oxygen-containing group and the other is a sulfur-containing group.

5. The method as claimed in claim 1, wherein n' adopts the value for all m L'(—$Y^6$—$M^2$—$Y^5$—$A^2$—$Y^4$—$P^2$)$_{n'}$ groups.

6. A compound of the general formula IIIa

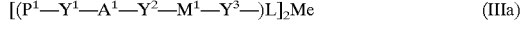

or IIIb

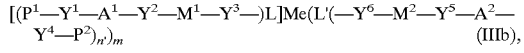

in which, independently of one another, $P^1$ and $P^2$ are a group which is polymerizable or suitable for polymerization, or a radical which carries a group which is polymerizable or suitable for polymerization, $Y^1$ to $Y^6$ are a single chemical bond, —O—, —S—, —CO—, —CO—O—, —O—CO—, —CO—N(R)—, —(R)N—CO—, —O—CO—O—, —O—CO—N(R)—, —(R)N—CO—O— or —(R)N—CO—N(R)—, R is hydrogen or $C_1$–$C_4$-alkyl, $A^1$ and $A^2$ are spacers having from one to 30 carbon atoms, $M^1$ and $M^2$ are mesogenic groups, n' is a value of 0 or 1, m is a value of 1, 2 or 3, where the m L'(—$Y^6$—$M^2$—$Y^5$—$A^2$—$Y^4$—$P^2$)$_{n'}$ groups in the formula IIIb may be different, Me is a transition metal from the fourth, fifth or sixth period, with the exception of technetium, silver, cadmium, gold, mercury and the lanthanoids, or a main-group element from group 14 (in the IUPAC system), with the exception of carbon and lead, L is a tridentate ligand of the formula II

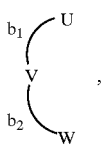

(II)

in which

U, V and W are nitrogen-, oxygen-, phosphorus- or sulfur-containing groups which contain a nitrogen, oxygen, phosphorus or sulfur atom respectively having at least one free electron pair via which the coordination to the center Me takes place, $b_1$ and $b_2$ are alkylene or alkenylene bridges having two or three carbon atoms which are bonded to the nitrogen, oxygen, phosphorus or sulfur atom of the groups U and V (for $b_1$) or of the groups V and W (for $b_2$) and which, in the case of a $C_2$-alkenylene bridge, may be substituted by up to two, in the other cases by up to four organic radicals having up to 12 carbon atoms, and in which two adjacent carbon atoms in the alkylene or alkenylene bridge may be part of an unsubstituted or substituted, simple or benzo-fused benzene ring, and L' is an organic radical having up to 12 carbon atoms.

7. A compound of the formula IIIa or IIIb as claimed in claim 6 in which

Me is a transition metal selected from the group consisting of titanium, chromium, manganese, iron, cobalt, copper, zirconium, molybdenum, ruthenium, rhodium and tungsten or is silicon.

8. A compound of the formula IIIa or IIIb as claimed in claim 6 in which, in the formula II, V is a nitrogen-containing group.

9. A compound of the formula IIIa or IIIb as claimed in claim 8 in which, in the formula II, U and W are either both an oxygen- or phosphorus-containing group or one of the groups U and W is an oxygen-containing group and the other is a sulfur-containing group.

10. (Currently Amended)A compound of the formula IIIb as claimed in claim 6 in which n' adopts the value 0 for all m L'(—$Y^6$—$M^2$—$Y^5$—$A^2$—$Y^4$—$P^2$)$_{n'}$ groups.

11. A liquid-crystalline composition comprising at least one liquid crystalline material and at least one compound of the formula Ia or Ib $$[(P^1—Y^1—A^1—Y^2—M^1—Y^3—)_nL]_2Me \quad (Ia)$$

$$[(P^1—Y^1—A^1—Y^2—M^1—Y^3—)_nL]Me(L'(—Y^6—M^2—Y^5—A^2—Y^4—P^2)_{n'})_m \quad (Ib),$$

in which, independently of one another, $P^1$ and $P^2$ are hydrogen, $C_1$–$C_{12}$-alkyl, a group which is polymerizable or suitable for polymerization, or a radical which carries a group which is polymerizable or suitable for polymerization, $Y^1$ to $Y^{16}$ are a single chemical bond, —O—, —S—, —CO—, —CO—C—, —O—CO—, —CO—N(R)—, —(R)N—CO—, —O—CO—C—, —O—CO—N(R)—, —(R)N—CO—O— or —(R)N—CO—N(R)—, R is hydrogen or $C_1$–$C_4$-alkyl, $A^1$ and $A^2$ are spacers having from one to 30 carbon atoms, $M^1$ and $M^2$ are mesogenic groups, n' and n are values of 0 or 1, m is a value of 1, 2 or 3, where the m L'(—$Y^6$—$M^2$—$Y^5$—$A^2$—$Y^4$—$P^2$)$_{n'}$ groups in the formula Ib may be different, Me is a transition metal from the fourth, fifth or sixth period, with the exception of technetium, silver, cadmium, gold, mercury and the lanthanoids, or a main-group element from group 14 (in the IUPAC system), with the exception of carbon and lead, L is a tridentate ligand of the formula II

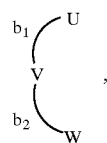

(II)

in which

U, V and W are nitrogen-, oxygen-, phosphorus- or sulfur-containing groups which contain a nitrogen, oxygen, phosphorus or sulfur atom respectively having at least one free electron pair via which the coordination to the center Me takes place, $b_1$ and $b_2$ are alkylene or alkenylene bridges having two or three carbon atoms which are bonded to the nitrogen, oxygen, phosphorus or sulfur atom of the groups U and V (for $b_1$) or of the groups V and W (for $b_2$) and which, in the case of a $C_2$-alkenylene bridge, may be substituted by up to two, in the other cases by up to four organic radicals having up to 12 carbon atoms, and in which two adjacent carbon atoms in the alkylene or alkenylene bridge may be part of an unsubstituted or substituted, simple or benzo-fused benzene ring, and L' is an organic radical having up to 12 carbon atoms.

12. The method according to claim 1, wherein said at least one chiral, uncharged compound is a compound of formula Ia.

13. The method according to claim 1, wherein said at least one chiral, uncharged compound is a compound of formula Ib.

14. The compound according to claim 6, wherein said compound is a compound of formula IIIa.

15. The compound according to claim 6, wherein said compound is a compound of formula IIIb.

16. The composition according to claim 11, wherein said compound is a compound of formula Ia.

17. The composition according to claim 11, wherein said compound is a compound of formula Ib.

18. The method of claim 1, wherein said at least one liquid crystalline material is a polymerizable liquid crystalline material.

19. The composition of claim 16, wherein said at least one liquid crystalline material is a polymerizable liquid crystalline material.

20. The composition of claim 17, wherein said at least one liquid crystalline material is a polymerizable liquid crystalline material.

21. A method, comprising polymerizing the composition of claim 19.

22. A method, comprising polymerizing the composition of claim 20.

23. A method, comprising polymerizing the composition of claim 16.

24. A method, comprising polymerizing the composition of claim 17.

25. A liquid-crystalline composition comprising at least one liquid crystalline material and a compound of the general formula IIIa

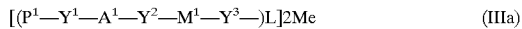

or IIIb

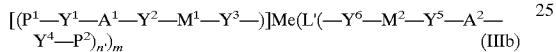

in which, independently of one another, $P^1$ and $P^2$ are a group which is polymerizable or suitable for polymerization, or a radical which carries a group which is polymerizable or suitable for polymerization, $Y^1$ to $Y^6$ are a single chemical bond, —O—, —S—, —CO—, —CO—O—, —O—CO—, —CO—N(R)—, —(R)N—CO—, —O—CO—O—, —O—CO—N(R)—, —(R)N—CO—O— or —(R)N—CO—N(R)—, R is hydrogen or $C_1$–$C_4$-alkyl, $A^1$ and $A^2$ are spacers having from one to 30 carbon atoms, $M^1$ and $M^2$ are mesogenic groups, n' is a value of 0 or 1, m is a value of 1, 2 or 3, where the m L'(—$Y_6$—$M^2$—$Y^5$—$A^2$—$Y^4$—$P^2$)$_{n'}$ groups in the formula IIIb may be different, Me is a transition metal from the fourth, fifth or sixth period, with the exception of technetium, silver, cadmium, gold, mercury and the lanthanoids, or a main-group element from group 14 (in the IUPAC system), with the exception of carbon and lead, L is a tridentate ligand of the formula II

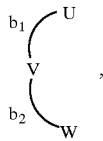

in which

U, V and W are nitrogen-, oxygen-, phosphorus- or sulfur-containing groups which contain a nitrogen, oxygen, phosphorus or sulfur atom respectively having at least one free electron pair via which the coordination to the center Me takes place, $b_1$ and $b_2$ are alkylene or alkenylene bridges having two or three carbon atoms which are bonded to the nitrogen, oxygen, phosphorus or sulfur atom of the groups U and V (for $b_1$) or of the groups V and W (for $b_2$) and which, in the case of a $C_2$-alkenylene bridge, may be substituted by up to two, in the other cases by up to four organic radicals having up to 12 carbon atoms, and in which two adjacent carbon atoms in the alkylene or alkenylene bridge may be part of an unsubstituted or substituted, simple or benzo-fused benzene ring, and L' is an organic radical having up to 12 carbon atoms.

26. The composition according to claim 25, wherein said compound is a compound of formula IIIa.

27. The composition according to claim 25, wherein said compound is a compound of formula IIIb.

28. A method, comprising polymerizing the composition of claim 26.

29. A method, comprising polymerizing the composition of claim 27.

30. The method of claim 28, wherein said at least one liquid crystalline material is a polymerizable liquid crystalline material.

31. The method of claim 29, wherein said at least one liquid crystalline material is a polymerizable liquid crystalline material.

* * * * *